(12) United States Patent
Murdock et al.

(10) Patent No.: US 9,637,920 B2
(45) Date of Patent: *May 2, 2017

(54) CARPET WASTE COMPOSITE

(71) Applicant: Material Innovations LLC, Providence, RI (US)

(72) Inventors: David E. Murdock, Dublin, OH (US); Douglas Mancosh, Warwick, RI (US); James P. Przybylinski, St. Helena, CA (US)

(73) Assignee: Material Innovations LLC, Providence, RI (US)

(*) Notice: Subject to any disclaimer, the term of this patent is extended or adjusted under 35 U.S.C. 154(b) by 85 days.

This patent is subject to a terminal disclaimer.

(21) Appl. No.: 14/339,991

(22) Filed: Jul. 24, 2014

(65) Prior Publication Data
US 2015/0024171 A1    Jan. 22, 2015

Related U.S. Application Data

(63) Continuation of application No. 13/597,481, filed on Aug. 29, 2012, now Pat. No. 8,809,406, which is a continuation of application No. 13/053,837, filed on Mar. 22, 2011, now Pat. No. 8,278,365, which is a continuation of application No. 11/846,865, filed on Aug. 29, 2007, now Pat. No. 7,923,477, which is a continuation-in-part of application No. 11/514,303, filed on Aug. 31, 2006, now Pat. No. 7,875,655, which is a continuation-in-part of application No. 11/507,366, filed on Aug. 21, 2006, now abandoned.

(60) Provisional application No. 60/760,500, filed on Jan. 20, 2006.

(51) Int. Cl.
| | | |
|---|---|---|
| B29B 17/02 | (2006.01) |
| E04C 2/24 | (2006.01) |
| B29B 17/00 | (2006.01) |
| C08G 18/02 | (2006.01) |
| C08G 18/76 | (2006.01) |
| C08J 5/04 | (2006.01) |
| C08J 11/04 | (2006.01) |
| C08L 75/04 | (2006.01) |
| B02C 19/18 | (2006.01) |
| C08L 97/02 | (2006.01) |
| E04C 2/30 | (2006.01) |
| B29K 105/16 | (2006.01) |
| B29K 105/26 | (2006.01) |
| B29K 711/14 | (2006.01) |
| B29L 7/00 | (2006.01) |
| B29L 31/00 | (2006.01) |

(52) U.S. Cl.
CPC ............ *E04C 2/246* (2013.01); *B02C 19/186* (2013.01); *B29B 17/0042* (2013.01); *C08G 18/02* (2013.01); *C08G 18/7657* (2013.01); *C08J 5/04* (2013.01); *C08J 11/04* (2013.01); *C08L 75/04* (2013.01); *C08L 97/02* (2013.01); *E04C 2/30* (2013.01); *B29K 2105/16* (2013.01); *B29K 2105/26* (2013.01); *B29K 2711/14* (2013.01); *B29L 2007/002* (2013.01); *B29L 2031/7322* (2013.01); *B32B 2272/00* (2013.01); *Y02P 20/143* (2015.11); *Y02W 30/62* (2015.05); *Y02W 30/70* (2015.05); *Y10T 428/24438* (2015.01); *Y10T 428/24479* (2015.01); *Y10T 428/24612* (2015.01); *Y10T 428/24802* (2015.01); *Y10T 428/31551* (2015.04); *Y10T 428/31554* (2015.04); *Y10T 428/31594* (2015.04); *Y10T 428/31935* (2015.04); *Y10T 428/31942* (2015.04); *Y10T 428/31946* (2015.04); *Y10T 428/31971* (2015.04)

(58) Field of Classification Search
CPC .................................................. B29B 17/0042
USPC ......................................... 521/40.5, 48, 49.8
See application file for complete search history.

(56) References Cited

U.S. PATENT DOCUMENTS

| | | |
|---|---|---|
| 3,170,832 A | 2/1965 | Wilson et al. |
| 3,471,355 A | 10/1969 | Truesdell et al. |
| 3,478,134 A | 11/1969 | Gruss |
| 3,511,750 A | 5/1970 | Hider |
| 3,560,324 A | 2/1971 | Quackenbush |
| 3,717,534 A | 2/1973 | Duling et al. |
| 3,801,417 A | 4/1974 | Shanok et al. |
| 3,856,724 A | 12/1974 | O'Connor et al. |
| 3,864,201 A | 2/1975 | Susuki et al. |
| 3,936,554 A | 2/1976 | Squier |
| 3,959,434 A | 5/1976 | Squier |

(Continued)

FOREIGN PATENT DOCUMENTS

| | | |
|---|---|---|
| CA | 2028527 | 3/1992 |
| CA | 2353036 | 7/2001 |

(Continued)

OTHER PUBLICATIONS

Anonymous: "Separation Process," Research Disclosure, Mason Publications, Hampshire, GB, vol. 388, No. 13, Aug. 1, 1996, ISSN: 0374-4353, 1 page.
Douglas J. Gardener, Adhesion Between Wood & Fiber Reinforced Polymers: Bonding Issues, Power Point Presentation, Advance Engineereed Wood Composites Center.

(Continued)

*Primary Examiner* — Edward Cain
(74) *Attorney, Agent, or Firm* — Goodwin Procter LLP

(57) ABSTRACT

A composite material is produced from carpet waste and a binding agent, in intimate association, and may also include wood fiber or chips and/or other additives. A method of manufacturing a composite material includes shredding carpet waste, coating the carpet waste with a binding agent, and subjecting the shredded, coated carpet waste to elevated heat and pressure. As an additional step, the composite material may be actively cooled to prevent deformation of the material.

30 Claims, 4 Drawing Sheets

(56) References Cited

U.S. PATENT DOCUMENTS

| | | |
|---|---|---|
| 3,970,324 A | 7/1976 | Howat |
| 3,995,980 A | 12/1976 | Smith |
| 4,025,686 A | 5/1977 | Zion |
| 4,028,159 A | 6/1977 | Norris |
| 4,045,603 A | 8/1977 | Smith |
| 4,154,893 A | 5/1979 | Goldman |
| 4,158,646 A | 6/1979 | Benkowski et al. |
| 4,212,703 A | 7/1980 | D'Amico et al. |
| 4,212,928 A | 7/1980 | Arney, Jr. |
| 4,315,048 A | 2/1982 | Beghelli et al. |
| 4,382,108 A | 5/1983 | Carroll et al. |
| 4,388,435 A | 6/1983 | Loch |
| 4,438,166 A | 3/1984 | Gluck et al. |
| 4,463,043 A | 7/1984 | Reeves et al. |
| 4,469,741 A | 9/1984 | Akao |
| 4,480,061 A | 10/1984 | Coughlin |
| 4,503,115 A | 3/1985 | Hemels et al. |
| 4,567,987 A | 2/1986 | Lepisto et al. |
| 4,695,501 A | 9/1987 | Robinson |
| 4,942,084 A | 7/1990 | Prince |
| 5,002,624 A | 3/1991 | Howell et al. |
| 5,130,352 A | 7/1992 | Chow |
| 5,134,026 A | 7/1992 | Melcher |
| 5,160,772 A | 11/1992 | Futami et al. |
| 5,217,655 A | 6/1993 | Schmidt |
| 5,275,862 A | 1/1994 | Ramadan et al. |
| 5,294,384 A | 3/1994 | David et al. |
| 5,393,536 A | 2/1995 | Brandt et al. |
| 5,441,801 A | 8/1995 | Deaner et al. |
| 5,486,553 A | 1/1996 | Deaner et al. |
| 5,496,648 A | 3/1996 | Held |
| 5,498,667 A | 3/1996 | David et al. |
| 5,516,472 A | 5/1996 | Laver |
| 5,534,590 A | 7/1996 | Horiie |
| 5,535,945 A | 7/1996 | Sferrazza et al. |
| 5,539,027 A | 7/1996 | Deaner et al. |
| 5,578,370 A | 11/1996 | Ferrar et al. |
| 5,591,802 A | 1/1997 | David et al. |
| 5,601,912 A | 2/1997 | Ellingson |
| 5,626,939 A | 5/1997 | Kotlair et al. |
| 5,641,553 A | 6/1997 | Tingley |
| 5,648,138 A | 7/1997 | Tingley |
| 5,662,994 A | 9/1997 | Funger et al. |
| 5,695,874 A | 12/1997 | Deaner et al. |
| 5,722,603 A | 3/1998 | Costello et al. |
| 5,725,939 A | 3/1998 | Nishibori |
| 5,728,741 A | 3/1998 | Zegler et al. |
| 5,735,092 A | 4/1998 | Clayton et al. |
| 5,738,935 A | 4/1998 | Turk et al. |
| 5,773,138 A | 6/1998 | Seethamraju et al. |
| 5,786,279 A | 7/1998 | Funger et al. |
| 5,786,280 A | 7/1998 | Funger et al. |
| 5,792,529 A | 8/1998 | May |
| 5,804,641 A | 9/1998 | Iwakawa |
| 5,827,462 A | 10/1998 | Brandt et al. |
| 5,827,607 A | 10/1998 | Deaner et al. |
| 5,836,128 A | 11/1998 | Groh et al. |
| 5,840,773 A | 11/1998 | Booij et al. |
| 5,847,016 A | 12/1998 | Cope |
| 5,858,522 A | 1/1999 | Turk et al. |
| 5,866,264 A | 2/1999 | Zehner et al. |
| 5,869,138 A | 2/1999 | Nishibori |
| 5,883,191 A | 3/1999 | Hughes |
| 5,912,315 A | 6/1999 | Horiie |
| 5,919,575 A | 7/1999 | Bowns, IV et al. |
| 5,932,334 A | 8/1999 | Deaner et al. |
| 5,948,524 A | 9/1999 | Seethamraju et al. |
| 5,951,927 A | 9/1999 | Cope |
| 5,981,067 A | 11/1999 | Seethamraju et al. |
| 6,004,668 A | 12/1999 | Deaner et al. |
| 6,007,590 A | 12/1999 | Sanders, Jr. |
| 6,011,091 A | 1/2000 | Zehner |
| 6,015,611 A | 1/2000 | Deaner et al. |
| 6,015,612 A | 1/2000 | Deaner et al. |
| 6,015,856 A | 1/2000 | Matsushita et al. |
| 6,054,207 A | 4/2000 | Finley |
| 6,059,207 A | 5/2000 | Costello et al. |
| 6,063,473 A | 5/2000 | Zafiroglu |
| 6,066,367 A | 5/2000 | Nishibori |
| 6,066,680 A | 5/2000 | Cope |
| 6,083,601 A | 7/2000 | Prince et al. |
| 6,096,403 A | 8/2000 | Wycech |
| 6,103,791 A | 8/2000 | Zehner |
| 6,106,654 A | 8/2000 | Velin et al. |
| 6,122,877 A | 9/2000 | Hendrickson et al. |
| 6,132,840 A | 10/2000 | Lee |
| 6,133,349 A | 10/2000 | Hughes |
| 6,180,211 B1 | 1/2001 | Held |
| 6,194,051 B1 | 2/2001 | Gagas et al. |
| 6,210,792 B1 | 4/2001 | Seethamraju et al. |
| 6,211,275 B1 | 4/2001 | Xanthos et al. |
| 6,217,967 B1 | 4/2001 | Bobrowicz |
| 6,241,168 B1 | 6/2001 | Young et al. |
| 6,265,037 B1 | 7/2001 | Godavarti et al. |
| 6,271,270 B1 | 8/2001 | Muzzy et al. |
| 6,274,637 B1 | 8/2001 | Schallenberg |
| 6,280,667 B1 | 8/2001 | Koenig et al. |
| 6,305,920 B1 | 10/2001 | Kean et al. |
| 6,306,318 B1 | 10/2001 | Ricciardelli et al. |
| 6,316,016 B1 | 11/2001 | Iwakawa |
| 6,342,172 B1 | 1/2002 | Finley |
| 6,344,268 B1 | 2/2002 | Stucky et al. |
| 6,344,515 B1 | 2/2002 | Parikh et al. |
| 6,352,784 B1 | 3/2002 | Katagiri |
| 6,357,197 B1 | 3/2002 | Serino et al. |
| 6,375,777 B1 | 4/2002 | Sjolin et al. |
| 6,383,652 B1 | 5/2002 | Templeton et al. |
| 6,387,967 B2 | 5/2002 | Muzzy et al. |
| 6,465,046 B1 | 10/2002 | Hansson et al. |
| 6,498,205 B1 | 12/2002 | Zehner |
| 6,511,757 B1 | 1/2003 | Brandt et al. |
| 6,517,935 B1 | 2/2003 | Kornfalt et al. |
| 6,526,712 B2 | 3/2003 | Brooks et al. |
| 6,534,592 B1 | 3/2003 | Chou et al. |
| 6,558,754 B1 | 5/2003 | Velin et al. |
| 6,565,919 B1 | 5/2003 | Hansson et al. |
| 6,579,605 B2 | 6/2003 | Zehner |
| 6,592,962 B2 | 7/2003 | Edwards et al. |
| 6,605,245 B1 | 8/2003 | Dubelsten et al. |
| 6,632,387 B2 | 10/2003 | Archuletta et al. |
| 6,632,863 B2 | 10/2003 | Hutchison et al. |
| 6,662,515 B2 | 12/2003 | Buhrts et al. |
| 6,673,207 B1 | 1/2004 | Nishibori |
| 6,680,090 B2 | 1/2004 | Godavarti et al. |
| 6,682,789 B2 | 1/2004 | Godavarti et al. |
| 6,682,814 B2 | 1/2004 | Hendrickson et al. |
| 6,685,993 B1 | 2/2004 | Hansson et al. |
| 6,692,815 B2 | 2/2004 | Edgman |
| 6,723,424 B2 | 4/2004 | Ricciardelli et al. |
| 6,749,921 B1 | 6/2004 | Edwards et al. |
| 6,756,412 B2 | 6/2004 | Muzzy |
| 6,758,996 B2 | 7/2004 | Monovoukas et al. |
| 6,761,794 B2 | 7/2004 | Mott et al. |
| 6,784,230 B1 | 8/2004 | Patterson et al. |
| 6,786,988 B1 | 9/2004 | Bell |
| 6,814,826 B1 | 11/2004 | Bell |
| 6,821,613 B1 | 11/2004 | Kagi et al. |
| 6,821,614 B1 | 11/2004 | Dubelsten et al. |
| 6,844,049 B2 | 1/2005 | Amin-Javaheri |
| 6,860,953 B1 | 3/2005 | Grizzle et al. |
| 6,863,972 B2 | 3/2005 | Burger et al. |
| 6,865,849 B1 | 3/2005 | Mollinger et al. |
| 6,866,081 B1 | 3/2005 | Nordgard et al. |
| 6,867,322 B1 | 3/2005 | Kato et al. |
| 6,872,674 B2 | 3/2005 | Williams et al. |
| 6,953,501 B2 | 10/2005 | Kelley et al. |
| 6,958,185 B1 | 10/2005 | Zehner |
| 6,971,211 B1 | 12/2005 | Zehner |
| 6,972,144 B2 | 12/2005 | Roth et al. |
| 7,022,751 B2 | 4/2006 | Zhang et al. |
| 7,030,179 B2 | 4/2006 | Patterson et al. |
| 7,037,459 B2 | 5/2006 | Easter |
| 7,045,590 B2 | 5/2006 | Bell |
| 7,169,464 B2 | 1/2007 | Semmens |

(56) References Cited

U.S. PATENT DOCUMENTS

| | | |
|---|---|---|
| 7,175,905 B2 | 2/2007 | Curtis et al. |
| 7,186,457 B1 | 3/2007 | Zehner et al. |
| 7,258,913 B2 | 8/2007 | Jo et al. |
| 7,335,424 B2 | 2/2008 | Domine et al. |
| 7,348,067 B1 | 3/2008 | Hoffman |
| 7,405,008 B2 | 7/2008 | Domine et al. |
| 7,409,796 B2 | 8/2008 | Sacks |
| 7,410,687 B2 | 8/2008 | Dolinar |
| 7,414,084 B2 | 8/2008 | Yamaguchi et al. |
| 7,416,779 B2 | 8/2008 | Hashiba et al. |
| 7,473,722 B2 | 1/2009 | Guiselin et al. |
| 7,507,464 B2 | 3/2009 | Walrath |
| 7,862,746 B2 | 1/2011 | Kaspers et al. |
| 7,875,655 B2 | 1/2011 | Mancosh et al. |
| 7,923,477 B2 | 4/2011 | Murdock et al. |
| 8,065,849 B2 | 11/2011 | Douglass |
| 8,278,365 B2 | 10/2012 | Murdock et al. |
| 8,455,558 B2 | 6/2013 | Mancosh et al. |
| 8,809,406 B2 | 8/2014 | Murdock et al. |
| 2001/0051243 A1 | 12/2001 | Godavarti et al. |
| 2001/0051249 A1 | 12/2001 | Gagas et al. |
| 2002/0007899 A1 | 1/2002 | Mott et al. |
| 2002/0009936 A1 | 1/2002 | North et al. |
| 2002/0014297 A1 | 2/2002 | Mott et al. |
| 2002/0025414 A1 | 2/2002 | Desai et al. |
| 2002/0031653 A1 | 3/2002 | Ricciardelli et al. |
| 2002/0031659 A1 | 3/2002 | Gansen et al. |
| 2002/0038924 A1 | 4/2002 | Nilsson et al. |
| 2002/0092256 A1 | 7/2002 | Hendrickson et al. |
| 2002/0096255 A1 | 7/2002 | Mott |
| 2002/0106498 A1 | 8/2002 | Deaner et al. |
| 2002/0192401 A1 | 12/2002 | Matsumoto et al. |
| 2002/0192431 A1 | 12/2002 | Edgman |
| 2003/0021915 A1 | 1/2003 | Rohatgi et al. |
| 2003/0075824 A1 | 4/2003 | Moore et al. |
| 2003/0087079 A1 | 5/2003 | Okabe et al. |
| 2003/0087572 A1 | 5/2003 | Balthes et al. |
| 2003/0087574 A1 | 5/2003 | Latimer et al. |
| 2003/0096094 A1 | 5/2003 | Hayduke |
| 2003/0104124 A1 | 6/2003 | Pavey et al. |
| 2003/0124940 A1 | 7/2003 | Michael |
| 2003/0125399 A1 | 7/2003 | Zhang et al. |
| 2003/0138616 A1 | 7/2003 | Englert |
| 2003/0154662 A1 | 8/2003 | Bruchu et al. |
| 2003/0198775 A1 | 10/2003 | Roth et al. |
| 2003/0207634 A1 | 11/2003 | Holeschovsky |
| 2003/0229160 A1 | 12/2003 | Williams et al. |
| 2004/0003888 A1 | 1/2004 | Mott et al. |
| 2004/0038002 A1 | 2/2004 | Franco et al. |
| 2004/0058163 A1 | 3/2004 | Gansen et al. |
| 2004/0062920 A1 | 4/2004 | Guilbert et al. |
| 2004/0076820 A1 | 4/2004 | Hodgson |
| 2004/0076846 A1 | 4/2004 | Domine et al. |
| 2004/0096628 A1 | 5/2004 | Saathoff et al. |
| 2004/0101674 A1 | 5/2004 | Ross |
| 2004/0126515 A1 | 7/2004 | Yarmoska |
| 2004/0126568 A1 | 7/2004 | Deaner et al. |
| 2004/0142160 A1 | 7/2004 | Cannon et al. |
| 2004/0161623 A1 | 8/2004 | Domine et al. |
| 2004/0161993 A1 | 8/2004 | Tripp et al. |
| 2004/0191617 A1 | 9/2004 | Visco et al. |
| 2004/0192794 A1 | 9/2004 | Patterson et al. |
| 2004/0224589 A1 | 11/2004 | Bacon et al. |
| 2004/0241392 A1 | 12/2004 | Sorrentino |
| 2004/0247845 A1 | 12/2004 | Abe et al. |
| 2004/0259973 A1 | 12/2004 | Sakuma et al. |
| 2005/0003221 A1 | 1/2005 | Walrath |
| 2005/0008814 A1 | 1/2005 | Bell |
| 2005/0019539 A1 | 1/2005 | Pike |
| 2005/0029709 A1 | 2/2005 | Jo et al. |
| 2005/0037176 A1 | 2/2005 | Domine |
| 2005/0042413 A1 | 2/2005 | Bell |
| 2005/0049329 A1 | 3/2005 | Faulkner |
| 2005/0058822 A1 | 3/2005 | Ittel |
| 2005/0115182 A1 | 6/2005 | Heiland |
| 2005/0132643 A1 | 6/2005 | Flanery et al. |
| 2005/0136272 A1 | 6/2005 | VanRheenen |
| 2005/0164580 A1 | 7/2005 | Holeschovsky |
| 2005/0170141 A1 | 8/2005 | Bacon et al. |
| 2005/0170157 A1 | 8/2005 | Armela et al. |
| 2005/0187315 A1 | 8/2005 | Dean |
| 2005/0206029 A1 | 9/2005 | Moore et al. |
| 2005/0233126 A1 | 10/2005 | Pike |
| 2005/0287347 A1 | 12/2005 | Sorrentino |
| 2006/0006564 A1 | 1/2006 | Maldas et al. |
| 2006/0032175 A1 | 2/2006 | Chen et al. |
| 2006/0099393 A1 | 5/2006 | Woodman et al. |
| 2006/0147669 A1 | 7/2006 | Mano et al. |
| 2006/0147687 A1 | 7/2006 | Ricciardelli et al. |
| 2006/0147693 A1 | 7/2006 | Przybylinski et al. |
| 2006/0165972 A1 | 7/2006 | Chimelak et al. |
| 2006/0183821 A1 | 8/2006 | Kaspers et al. |
| 2006/0188734 A1 | 8/2006 | Valentage et al. |
| 2006/0191655 A1 | 8/2006 | Nunn et al. |
| 2006/0229381 A1 | 10/2006 | Bartko |
| 2006/0257597 A1 | 11/2006 | Gleich |
| 2006/0267238 A1 | 11/2006 | Wang |
| 2007/0007682 A1 | 1/2007 | Maldas et al. |
| 2007/0009729 A1 | 1/2007 | Kessing |
| 2007/0009743 A1 | 1/2007 | Kessing et al. |
| 2007/0043128 A1 | 2/2007 | Jenkines et al. |
| 2007/0092701 A1 | 4/2007 | Jeng |
| 2007/0098972 A1 | 5/2007 | Balthes |
| 2007/0104930 A1 | 5/2007 | Grohman |
| 2007/0113759 A1 | 5/2007 | Roth et al. |
| 2007/0128428 A1 | 6/2007 | Moriya et al. |
| 2007/0141316 A1 | 6/2007 | McGrath et al. |
| 2007/0154669 A1 | 7/2007 | Schneider et al. |
| 2007/0154689 A1 | 7/2007 | Hughes et al. |
| 2007/0173551 A1 | 7/2007 | Mancosh et al. |
| 2007/0212531 A1 | 9/2007 | McIntyre et al. |
| 2007/0235705 A1 | 10/2007 | Burger et al. |
| 2007/0275207 A1 | 11/2007 | Higgins et al. |
| 2008/0010924 A1 | 1/2008 | Pietruczynik et al. |
| 2008/0064794 A1 | 3/2008 | Murdock et al. |
| 2008/0075915 A1 | 3/2008 | Wening et al. |
| 2008/0093763 A1 | 4/2008 | Mancosh et al. |
| 2008/0098935 A1 | 5/2008 | Roth et al. |
| 2008/0102263 A1 | 5/2008 | Slywchuk et al. |
| 2008/0128933 A1 | 6/2008 | Przybylinski et al. |
| 2008/0213562 A1 | 9/2008 | Przybylinski et al. |
| 2008/0233336 A1 | 9/2008 | Giannopoulos et al. |
| 2008/0263994 A1 | 10/2008 | Kain |
| 2008/0287576 A1 | 11/2008 | Nichols et al. |
| 2008/0289295 A1 | 11/2008 | Waters et al. |
| 2008/0293837 A1 | 11/2008 | Toft et al. |
| 2009/0130355 A1 | 5/2009 | Chen et al. |
| 2009/0202803 A1 | 8/2009 | Poloso et al. |
| 2009/0288582 A1 | 11/2009 | Glessner et al. |
| 2010/0021753 A1 | 1/2010 | Hojabr et al. |
| 2010/0058957 A1 | 3/2010 | Boxley |
| 2010/0159213 A1 | 6/2010 | Przybylinski et al. |
| 2011/0020619 A1 | 1/2011 | Van Den Bossche et al. |
| 2011/0045250 A1 | 2/2011 | De Zen |
| 2012/0077890 A1 | 3/2012 | Mancosh et al. |

FOREIGN PATENT DOCUMENTS

| | | |
|---|---|---|
| CA | 2594258 | 7/2006 |
| CA | 2538539 | 9/2006 |
| CA | 2607928 | 4/2008 |
| CN | 1821295 | 8/2006 |
| CN | 101015929 A | 8/2007 |
| CN | 201295961 Y | 8/2009 |
| CN | 101538356 | 9/2009 |
| CN | 201420361 Y | 3/2010 |
| CN | 101830070 A | 9/2010 |
| DE | 24 44 420 | 3/1976 |
| DE | 43 38 199 | 2/1995 |
| DE | 102008046481 A1 | 3/2010 |
| EP | 114409 | 8/1984 |
| EP | 0473379 | 3/1992 |
| EP | 0 0688 644 | 12/1995 |
| EP | 950510 | 10/1999 |

(56) References Cited

FOREIGN PATENT DOCUMENTS

| | | |
|---|---|---|
| EP | 1016558 | 12/2005 |
| GB | 2071007 A | 9/1981 |
| JP | 51 062883 | 5/1976 |
| JP | 1-105096 | 4/1989 |
| JP | 02150303 A | 6/1990 |
| JP | 6155432 | 6/1994 |
| JP | 2000263624 A | 9/2000 |
| JP | 2001072817 | 3/2001 |
| JP | 2002241514 A | 8/2002 |
| JP | 2003003018 | 1/2003 |
| JP | 2005 312782 | 11/2005 |
| KR | 20070111293 | 11/2007 |
| SE | 504501 | 2/1997 |
| WO | WO-96/12857 | 5/1996 |
| WO | WO-97/35700 | 10/1997 |
| WO | WO-98/25983 | 6/1998 |
| WO | WO-99/07786 | 2/1999 |
| WO | WO-99/35364 | 7/1999 |
| WO | WO-00/24577 | 5/2000 |
| WO | WO-00/73037 | 12/2000 |
| WO | WO-01/47717 | 7/2001 |
| WO | WO-01/47718 | 7/2001 |
| WO | WO-01/48333 | 7/2001 |
| WO | WO-01/58663 | 8/2001 |
| WO | WO-01/78981 | 10/2001 |
| WO | WO-0176869 | 10/2001 |
| WO | WO-02/04206 | 1/2002 |
| WO | WO-02/04207 | 1/2002 |
| WO | WO-02/04208 | 1/2002 |
| WO | WO-02/47906 | 6/2002 |
| WO | WO-02/057692 | 7/2002 |
| WO | WO-02/072367 | 9/2002 |
| WO | WO-02/090129 | 11/2002 |
| WO | WO-03/002338 | 1/2003 |
| WO | WO-03/047858 | 6/2003 |
| WO | WO-03/061967 | 7/2003 |
| WO | WO-03/064520 | 8/2003 |
| WO | WO-03/080337 | 10/2003 |
| WO | WO-03/095537 | 11/2003 |
| WO | WO-2004/041534 | 5/2004 |
| WO | WO-2004/083541 | 9/2004 |
| WO | WO-2005/007384 | 1/2005 |
| WO | WO-2005/021656 | 3/2005 |
| WO | WO-2005/039843 | 5/2005 |
| WO | WO-2005/063479 | 7/2005 |
| WO | WO-2005/080496 | 9/2005 |
| WO | WO-2005/123380 | 12/2005 |
| WO | WO-2006/074276 | 7/2006 |
| WO | WO-2007/056629 | 5/2007 |
| WO | WO-2007/084822 | 7/2007 |
| WO | WO-2008/066751 | 6/2008 |
| WO | WO-2009/153324 | 12/2009 |
| WO | WO-2012/103378 | 8/2012 |

OTHER PUBLICATIONS

European Office Action for 07862186.9 dated May 4, 2010 (7 pages).
"Geon Duracap Vinyl Capstock," downloaded on Jun. 13, 2012 from http://www.polyone.com/en-us/products/vinylextrusionmold/Pages/DuracapVinylCapstockCompounds.aspx, 2 pages.
Preliminary Report with Written Opinion for International application PCT/US2011/046798, mailed from the International Search Authority on Feb. 21, 2013, 9 pgs.
International Search Report & Written Opinion for PCT/US2009/32552, mailed Sep. 15, 2009 (22 pages).
International Search Report and Written Opinion for PCT/US2009/068964 mailed Aug. 10, 2010 (14 pages).
International Search Report and Written Opinion for PCT/US2011/046798 mailed Feb. 3, 2012 (13 pages).
International Search Report and Written Opinion for PCT/US2012/042248, mailed Feb. 19, 2013 (27 pages).
International Search Report for International application PCT/US2007/024313, mailed from the International Search Authority on Apr. 15, 2008, 13 pgs.
International Search Report for PCT/US07/60381 dated Oct. 1, 2007, 8 pp.
Jan H. Schut, Foaming Expands Possibilities for Wood-Fiber Composites, Plastics Technology, www.ptonline.com, Oct. 17, 2008.
Jan H. Schut, Wood is Good for Compounding, Sheet & Profile, Plastics Technology, www.ptonline.com, Oct. 17, 2008.
Jennifer Markarian, Wood Plastic Composites Need Protection, Too, Plastics Engineering, www.4spe.org., Jul. 2007.
K. Oksman, Improved interaction between wood and synthetic polymers in wood/polymer composites, Department of Wood Technology, Lulea University, Skelleftea, Sweden, Wood Science and Technology, vol. 30, Issue 3, Jun. 1996, pp. 197-205.
Krzysik et al., Wood-Polymer Bonding in Extruded and Non-Woven Web Composite Panels, Wood Adhesives 1990: Proceedings of a Symposium, Madison, WI, Forest Products Research Society, p. 183-189, 1991.
Maged Botros, Ph.D., Development of New Generation Coupling Agents for Wood-Plastic Composites, Equistar, Intertech Conference Dec. 3-5, 2003.
"New Wood Plastic Composite Products Strengthen CertainTeed's Position as one-stop-shop for Railing and Decking," downloaded on Jun. 13, 2012 from http://www.certainteed.com/pressroom/pressRelease.aspx?id=301#, 2 pages.
Nicole M. Stark and Laurent M. Matuana, Coating WPCS using Co-Extrusion to improve Durability, Coating Wood & Wood Composites: Designing for Durability, Federation of Societies for Coatings Technology, Jul. 23-25, 2007.
Partial International Search for PCT/US2012/042248 dated Oct. 8, 2012, 3 pages.
Partial International Search Report for PCT/US09/032552 dated Jun. 6, 2009, 2 pgs.
"Reclaim and Resin Prices Skyrocket," Sep. 2004, http://www.principiaconsulting.com/publishing/pdf/WPCNewsSept04.pdf, 8 pages.
San Diego Plastics, "Celuka Procedure," website: www.sdplastics.com/celukaprocess.html, undated, accessed Dec. 11, 2008, 1 pg.
Scott Gibson, Wood Substitutes Cost More but Promise Less Maintenance, Professional Deck Builder Online/Hanldy Wood, www.deckmagazine.com, Oct. 17, 2008.
Techwoodn decking, Technical sheet, downloaded on Sep. 17, 2013 from http://www.techwoodn.com/material.php?id=7, 4 pages.
Techwoodn decking, Technical sheet, downloaded on Sep. 17, 2013 from http://www.google.com/url?sa=t&rct=j&q=&esrc=s&frm=1&source=web&cd=1&cad=rja&ved=0CCkQFjAA&url=http%3A%2F%2Fwww.techwoodn.com%2Fdata%2Fshwh%2F110222%2F1102220110854tajktw.pdf&ei=wnw4UsKyLJWj4APC2oDQAw&usg=AFQjCNFIXJ5CdkRTOyPz-I2A3D8cTEeTyQ, 6 pages.
"The Fast Growing Wood Plastic Composites WPC," downloaded on Jun. 13, 2012 from, http://www.steerworld.com/downloads/KnowledgeCenter/Review%20Articles/THE%20FAST%20GROWING%20WPC.pdf, 5 pages.
Tieq Li and Ning Yan, Ionomer as a multi-functional ingredient for value-added wood-plastic composites, Faculty of Forestry, University of Toronto.
Tieqi Li and Ning Yan, Mechanical properties of wood flour/HDPE/Ionomer composites, Faculty of Forestry, University of Toronto, Toronto Ontario Canada, Composites Part A: Applied Science and Manufacturing, vol. 38, Issue 1, Jan. 2007, pp. 1-12.
WiseGeek, "What are Foam Extrusions?," website: www.wisegeek.com/what-are-foam-extrusions.htm, 2003-2008, accessed Dec. 11, 2008, 2 pages.
"Wood-Plastic Composites need protection, too," downloaded on Jun. 13, 2012 from http://www.freepatentsonline.com/article/Plastics-Engineering/166824015.html, 4 pages.
"Wood-Filled Composites Jump off the Deck," downloaded on Jun. 13, 2012 from http://www.compositesworld.com/articles/wood-filled-composites-jump-off-the-deck, 6 pages.
Nimz et al., "Wood, Ullmann's Encyclopedia of Industrial Chemistry," 2000, 454-505.

(56) References Cited

OTHER PUBLICATIONS

Qiao, et al., "Effect of particle size and volume fraction on tensile properties of fly ash/polyurea composites," Behavior and Mechanics of Multifunctional Materials and Composites, 2010.

"Polyolefin Elastomers," published by the International Institute of Synthetic Rubber Producers, available at: www.iisrp.com/WebPolymers/05ModPolyolefinElast_v1-2.pdfý, 3 pages.

"Exact™ Plastomers," published by Exxon Mobil, available at: http://www.exxonmobilchemical.com/Chem-English/brands/exact-plastomers.aspx?In=pr, 1 page.

"Fact Sheet: ENGAGE™ Polyolefin Elastomers—A product of Dow's Specialty Plastics and Elastomers business, ENGAGE™ is bridging the gap between rubber and plastic, and inspiring new design possibilities," published by The Dow Chemical Company, available at: http://www.dow.com/elastomers/products/engage.htm., 2 pages.

CARPET WASTE COMPOSITE

CROSS-REFERENCE TO RELATED APPLICATIONS

This application is a continuation of and claims priority to U.S. application Ser. No. 13/597,481, filed Aug. 29, 2012, which is a continuation of and claims priority to U.S. application Ser. No. 13/053,837, filed on Mar. 22, 2011, which is a continuation of and claims priority to U.S. application Ser. No. 11/846,865, filed on Aug. 29, 2007, which is a continuation-in-part application of and claims priority to U.S. application Ser. No. 11/514,303, filed on Aug. 31, 2006, which is a continuation-in-part of and claims priority to U.S. application Ser. No. 11/507,366, filed on Aug. 21, 2006, which claims priority to U.S. Application Ser. No. 60/760,500, filed on Jan. 20, 2006, all of which are hereby incorporated by reference herein in their entireties.

FIELD OF THE INVENTION

This invention relates to systems and methods for fabricating plastic composites (PCs) and, more particularly, to systems and methods for plastic composites that employ recycled carpet waste as a component of the composite.

BACKGROUND OF THE INVENTION

Natural and manmade composites can be used in building construction, industrial applications, consumer goods, automotive products, and other industries requiring moisture or thermal resistance with various physical properties, such as low moisture absorbance and low thermal distortion. The ability to build composites of this nature, while controlling physical properties such as strength, stiffness, ductility, impact resistance, and hardness, opens a variety of application opportunities. PCs, however, may be expensive to produce, due in part to the high cost of virgin thermoplastic materials used therein. While use of PCs may be desirable as an alternative to natural wood products to limit the depletion of timber resources, the high cost of PCs compared to wood products may limit their use. Moreover, manufacturing PCs requires the manufacturing of even more virgin plastics, thus presenting an additional environmental problem.

There exists growing pressure to re-utilize waste streams which are high in volume and low in degradability. In particular the manufacture, installation, use and (eventually) replacement of floor covering products, especially carpeting, produces a large amount of waste product. Carpet waste from new carpet production, post-consumer landfill or other used carpet applications, is a several billion pound-per-year waste problem. Often, carpet waste is not recycled, but rather is disposed of by land-filling or burning, with the obvious attendant environmental and cost concerns.

What is needed, then, is a plastic composite that may still function acceptably in a variety of applications, while being inexpensive to manufacture, due to incorporation of readily available waste products.

SUMMARY

In one aspect, the invention relates to a composite adapted for use as a building material, the composite including processed carpet waste, between about 2% and about 10% binding agent by weight of the composite, and between about 20% and about 30% natural fibers by weight of the composite in intimate association with the recycled carpet waste and the binding agent. In an embodiment of the above aspect, the composite includes about 5% binding agent, by weight. In another embodiment, the composite has about 30% natural fibers, by weight. In certain embodiments of the above aspect, the processed carpet waste includes a material selected from the group consisting of wool, nylon, polyester, polypropylene, jute, sisal, and combinations thereof. In certain embodiments of the above aspect, the natural fibers are selected from the group consisting of wood chips, wood flour, wood flakes, sawdust, flax, jute, hemp, kenaf, rice hulls, abaca, and combinations thereof.

In yet another embodiment of the above aspect, the composite includes an additive selected from the group consisting of a colorant, a fire retardant, a fiberglass, a mold inhibitor, and combinations thereof. In certain embodiments, the processed carpet waste is at least one of post-industrial waste and post-consumer waste. In other embodiments of the above aspect, after submersion testing according to ASTM D1037-96A, the composite exhibits water absorption of not more than about 3%, by weight. Other embodiments of the composite include processed carpet waste having a melted polypropylene and an unmelted nylon. In certain embodiments, the processed carpet waste is at least one of a pelletized carpet waste and a fiber carpet waste.

In another aspect, the invention relates to a method of manufacturing a composite adapted for use as a building material, the method including the steps of applying heat and pressure to a processed carpet waste and a binding agent to form the composite material, and cooling the composite material while applying pressure to the composite material. This aspect may include the step of processing carpet waste, wherein the processing step is at least one of chopping, shredding, grinding, contaminant separating, palletizing, agglomerating, pulverizing, fine grinding, and fiberizing the carpet waste. In some embodiments of the above aspect, the step of applying heat and pressure occurs in a first cycle press, and wherein the step of cooling the composite while applying pressure occurs in a second cycle press. In other embodiments, the step of applying heat and pressure and the step of cooling the composite while applying pressure occur in a first cycle press. In still other embodiments of the above aspect, the step of applying pressure heats the composite material to a temperature of about 100° F. to about 600° F., to a temperature of about 200° F. to about 550° F., to a temperature of about 340° F. to about 420° F., or to a temperature of about 420° F. to about 500° F. In yet another embodiment, the step of cooling the composite material while applying pressure cools the composite material to a temperature of about 300° F. to about 32° F., or to a temperature of about 250° F. to about 180° F., or to a temperature of about 80° F.

In another embodiment of the above aspect, the pressure applied during the applying heat step and the cooling step is substantially constant. Certain embodiments may include the processed carpet waste as an unmelted carpet waste. Additional embodiments include the step of mixing the processed carpet waste and the binding agent. In some embodiments of the above aspect, the composite has about 90% to about 98% processed carpet waste, by weight, or about 95% processed carpet waste, by weight. In another aspect, the invention relates to a composite building material manufactured according to the processes described above.

DESCRIPTION OF DRAWINGS

Other features and advantages of the present invention, as well as the invention itself, will be more fully understood from the following description of the various embodiments, when read together with the accompanying drawings, in which.

DETAILED DESCRIPTION

The new systems and methods can be used to process and combine recycled carpet waste with a binding agent to form a PC with equivalent properties to those PCs made with virgin plastics at reduced cost.

Figure 1:
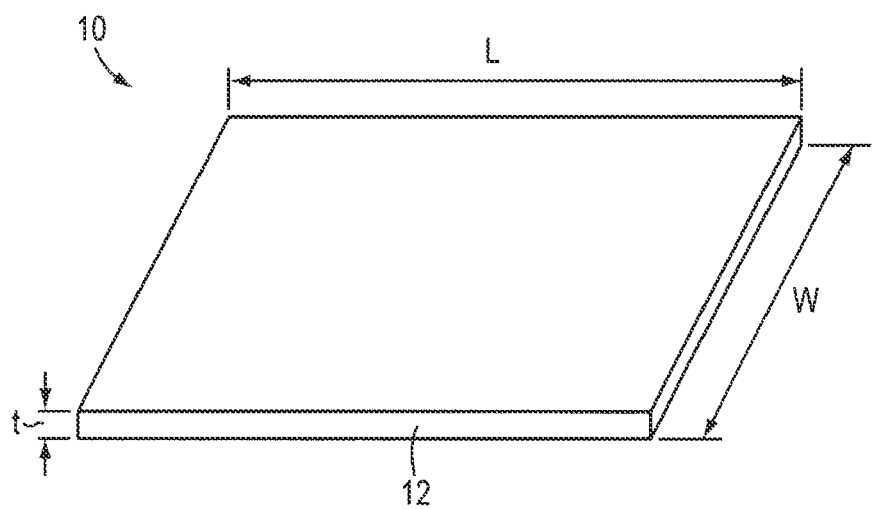
FIG. 1 is a perspective view of a plastic composite fabricated in accordance with one embodiment of the present invention.

FIG. 1 shows one embodiment of a sheet or board plastic composite 10 including recycled carpet waste formed in accordance with the present disclosure. The composite 10 is generally a dimensional composite body 12 formed from a mixture including recycled carpet waste and a binding agent. Length L, width W, and thickness t, of the composite 10 are dictated by the production machinery used. Functional performance parameters of the composite 10 may be defined in part by the amount of carpet waste, binding agent, natural fillers, and other optional additives. In general, however, the density of the composite 10 is directly related to the total amount of carpet waste used and the final thickness t of the board. The recycled carpet waste, which may be blended or dispersed with natural fillers within the fiber-polymer compound, results in a composite having physical properties equivalent to PCs made with virgin thermoplastics. The recycled carpet waste may be processed into a fiber fluff, or other form, from post-industrial or post-consumer carpet waste. Depending on the composition of the carpet used, the recycled carpet waste can include wool, nylon, polyester, polypropylene, jute, sisal, like materials, and combinations thereof. Due at least in part to processing controls, described in greater detail in the following paragraphs, the recycled carpet waste is dispersed and distributed substantially uniformly throughout the composite 10. Various binding agents may be utilized as desired for a given application. Certain embodiments of a PC made in accordance with the present invention utilize methylenediphenyldiisocyanate (MDI). MDI acts as a binding agent for the fibers or agglomerated carpet waste materials to contribute to the structural integrity of the composite products. As an alternative to MDI, binding can be accomplished using urea formaldehyde (UF), melamine urea formaldehyde (MLTF), phenol formaldehyde (PF), similar binding agents, and combinations of agents.

In addition to the binding agent, the composite 10 may incorporate natural fibers to help provide the composite with the appearance and feel of a natural wood product. Types of natural fibers, such as wood fillers or the like, include wood chips, wood flour, wood flakes, wood shavings, sawdust, flax, jute, abaca, hemp, kenaf, rice hulls, like materials, and combinations thereof. The sizes of the various natural fibers is not critical and may range from that of sawdust and wood flour, up to and exceeding 1" long wood chips, though fibers and chips less than about 0.5" may be preferred. The composite may include additives such as colorants, lubricants, flame retardants, compatiblizers, coupling agents, other materials, and combinations thereof. The relative amounts of components (i.e., recycled carpet waste, filler, additives, etc.) may be modified as desired for a particular application. The various component amounts, ratios of components, and finished composite properties in certain embodiments, are described in more detail below.

Unless otherwise noted, the use of one material when describing a particular application, process, or embodiment does not limit the described application, process, or embodiment to the specific material identified. The materials may be used interchangeably, in accordance with the described teachings herein. Moreover, the terms "PCs," "composite sheets," and the like, are used interchangeably herein to describe plastic composite boards or sheets made from recycled carpet waste which may include additional additives. In addition to PCs, other composite products may be manufactured utilizing, in whole or in part, recycled carpet waste. A non-limiting list of such composite products include plastic piping, molded articles such as flower pots or seeding trays, building siding or roofing, fencing, furniture, or other types of extruded, injection molded, and/or compression molded products.

Figure 2:
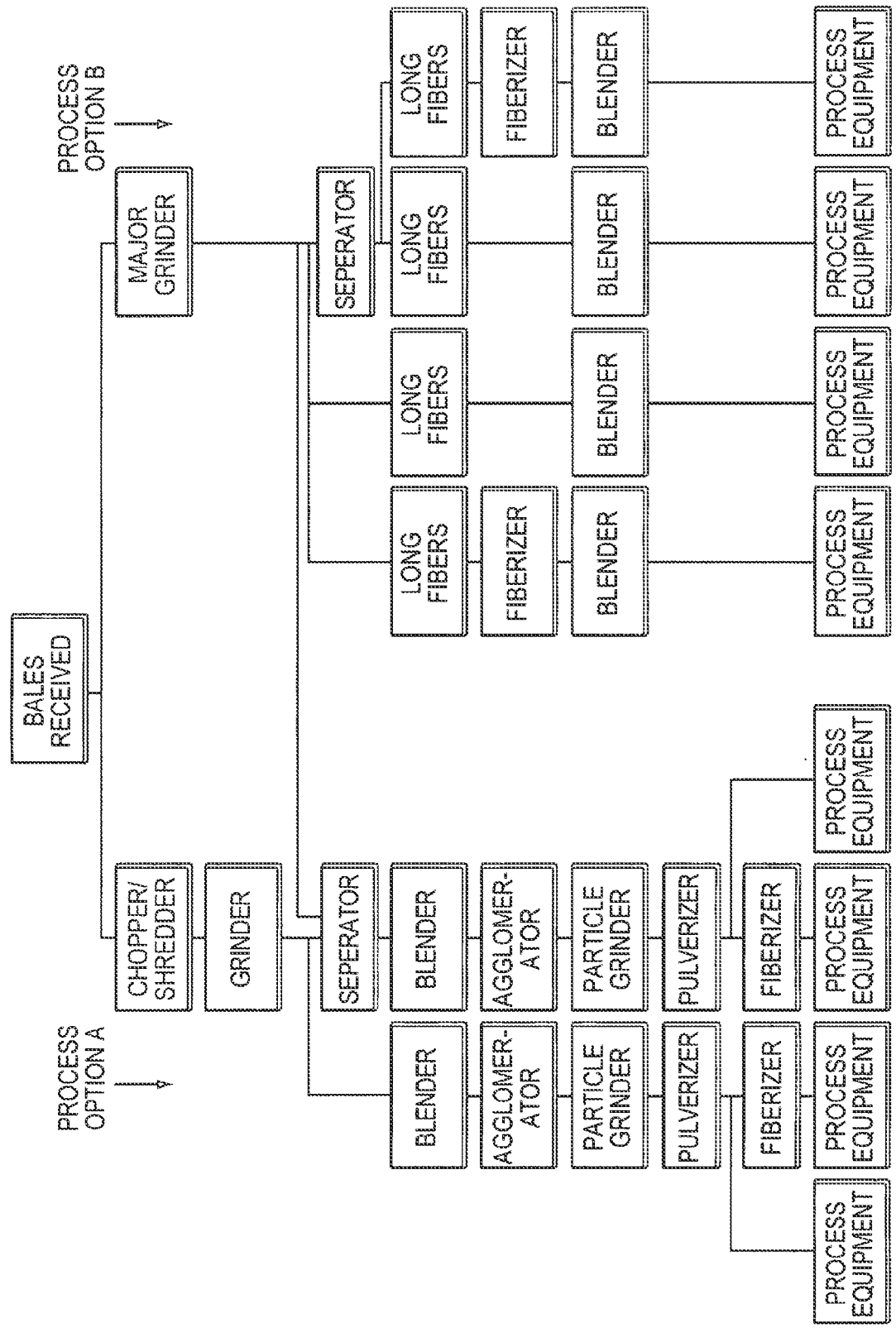
FIG. 2 is a flow chart depicting the types of size reduction equipment and the variety of size reduction procedures depending on the final carpet waste material form desired for the process equipment.

FIG. 2 shows the types of equipment and the variety of procedures for carpet waste size reduction, depending on the final form desired for the process equipment. The final form may also be dependent on the desired finished composite product and physical or visual appearance properties. In short, the carpet waste is processed as described below to reduce its size. Then the size-reduced carpet waste is mixed or coated with a binder to produce material that is subjected to temperature and/or pressure to yield composite material. The size reduction process may take place at the same facility where the PCs are manufactured, or the carpet waste may be processed at a first facility and delivered to a second facility for incorporation into the PC products. Post-manufacture treatments for the composite material are also described below.

The carpet waste is made up of selvedge, post-industrial carpet waste, post-consumer carpet waste, or waste carpet reclaimed from landfills. Post-industrial carpet waste refers generally to waste material produced as a byproduct to the manufacturing process, such as trimmed carpet segments, as well as to carpet that fails to pass quality or other inspections, thus rendering it unsuitable for consumer use. Post-consumer carpet waste refers generally to carpet waste that is generated during installation at a consumer site or that is removed from a consumer site during demolition and/or replacement. Regardless, the terms selvedge, carpet waste, waste carpet, reclaimed waste, recycled waste, and similar terms are used herein interchangeably and may be used in the processes described herein interchangeably. These materials generally will be in baled form to begin the size reduction phase of the pre-processing. The bales vary in size but usually are about 1000 lb. to about 2000 lb. All of the equipment described in the carpet reduction processes below may be supplied by Pallmann Maschinenfabrik GMBH, of other manufacturers that produce similar equipment. Alternative manufacturers of specific equipment are identified below.

The first step in the size reduction phase includes reducing the waste to a manageable size for the remainder of the process. As depicted in FIG. 2, either a combination of a shredder/chopper and grinder (Process Option A), or a major capacity grinder (Process Option B) is used to process the materials to smaller sizes. Process Option A may be used to reduce carpet waste to pellets or granules that may be further processed into various PC products. The shredder/chopper first reduces the selvedge or carpet waste to chunks approximately three inches square (3"×3"), although other sizes are contemplated, depending on the equipment used. In addition to Pallmann Maschinenfabrik, the shredder/chopper may be manufactured by Vecoplan, LLC, or Weima America, Inc. The shredded material then passes through a grinder which further reduces the chunks to a fiber fluff material with a diameter of the fibers similar to the diameter of the original carpet fibers and a length of about 0.25" to about 1". Other manufactures of comparable grinders include Vecoplan, LLC, Cumberland Engineering Corp., and Republic Machine, Inc.

The waste optionally can be run through a separator which acts as a hammer mill/cyclone to remove the dirt from the carpet waste. In this step, some of the carpet backing containing inorganic fillers may also be removed. Generally, however, it is unnecessary to deliberately separate the various carpet components prior to incorporating the recycled carpet waste into PCs. All of the components of carpet may be used, not only one component, such as the carpet fibers, as certain known methods disclose. Thus, manufacturing time is decreased, since the step of component separation is not utilized. The slightly-size reduced material, due to the hammer mill effect, is ready for the next step, the agglomeration process, while the dirt and carpet backing materials that may have been removed from the small chunks are disposed. Carpet backing that is not removed, however, does not have any adverse effect when incorporated into a PC using recycled carpet waste. The fiber fluff, regardless of the use of the separator or not, also may be blended with other materials such as wood or natural fibers, synthetic fibers (i.e., fiberglass), inorganic fillers, or other reinforcing fillers. The fiber fluff material or the blended material is then conveyed to the agglomeration step.

The agglomeration of the above materials occurs inside the agglomerator. The materials enter a horizontal drum containing a revolving rotor that is shaped so as to force the fiber fluff or blends against the drum wall. The drum wall is perforated so that, as the rotor forces the contained materials against the perforated wall, the material is forced through the perforations, thereby forming strands of a fixed diameter. On the outside of the drum are stationary knives which cut the strands into a fixed length. During this process, the material is heated by friction to a temperature that remains below the melting point of the highest melting point material in the blend. The temperature is controlled by the speed of the rotor, the diameter of the perforations, and the thickness of the drum wall. As each component of the carpet waste, i.e., backing and carpet fibers, is pressed against the wall of the drum, that material heats up due to friction, until the material sufficiently softens, such that it is then pressed through the perforated drum by the rotor. The agglomerating machinery could be replaced by a pellet mill manufactured by Bliss Industries or California Pellet Mill Co.

The granules that are formed in the agglomeration step are generally cylindrical in shape and approximately 0.125" in diameter and about 0.125" to about 0.25" long. The diameter and length of the granules can be modified by changing the diameter of the holes in the drum wall and/or changing the speed of the rotation against the knives. Because the granules are hot when they are formed and cut to length, some of the granules may be stuck to one another. Therefore, for better size consistency, the granules next pass through a grinder which separates any stuck granules. This grinder step may also be used to reduce the size of the granules, and/or the granules may be further reduced in size by a pulverizer. For example, if the final desired dimension is less than 0.125", the pulverizer may be used to reduce the particle size to 8-16 mesh. This is the equivalent of about 0.04" to about 0.10".

As an optional step, the granules or pulverized particles may be fiberized. The fiberizing process includes a mechanical roughing of the surface so that the surface takes on a fuzz-like characteristic that may be desirable for the composite product process described below. After processing to the desired condition, the material is then sent to the composite production process.

As an alternative to the above process, Process Option B may be used to reduce carpet waste to a fiberized mass. First, a major capacity grinder reduces the carpet waste to fibers about 0.25" to about 1.0" in length and about 1/32" to about 0.125" in diameter may be utilized. These random-sized fibers are ready for the agglomeration process or for alternative processes not requiring agglomeration. Next, the material optionally may be passed through a separator, as described above. The fibers may then be passed through the agglomeration process as described above, or the fibers may pass directly to the fiberizer equipment. Again, the fiberizer changes the surface characteristics of the fibers, giving them a fuzz-like surface with greater surface area and a different bulk density. The fiberizing step is again optional, and may not be required for all end uses of the composite products. Next, the fibers pass through a blender where wood or natural fibers, synthetic fibers (i.e., fiberglass), inorganic fillers, or mineral fillers (if any) may be added. Once the blending of the fibers and added materials is complete, the blend is ready for the composite production process.

Significantly, it has been determined that it is not necessary to separate or classify the various materials contained in selvedge or carpet waste, even though most carpet surface materials are nylons, polyester, polypropylene, or wool and the backing material is usually polypropylene and/or highly filled synthetic latex. These materials exhibit considerably different physical properties and processing properties, but the entire waste product may be used in the composite sheet material, regardless of the differences in the components that comprise the carpet waste. The waste carpet, having been made into an agglomerate, a fiberized agglomerate, a pulverized agglomerate, a fiberized, pulverized agglomerate, a fiberized fluff, etc., becomes the base material for the composite product. Additionally, other waste fiber or fiberized waste fiber may also be used to manufacture a composite product. The whole range of materials in carpet waste may be part of the composition.

Figure 3:
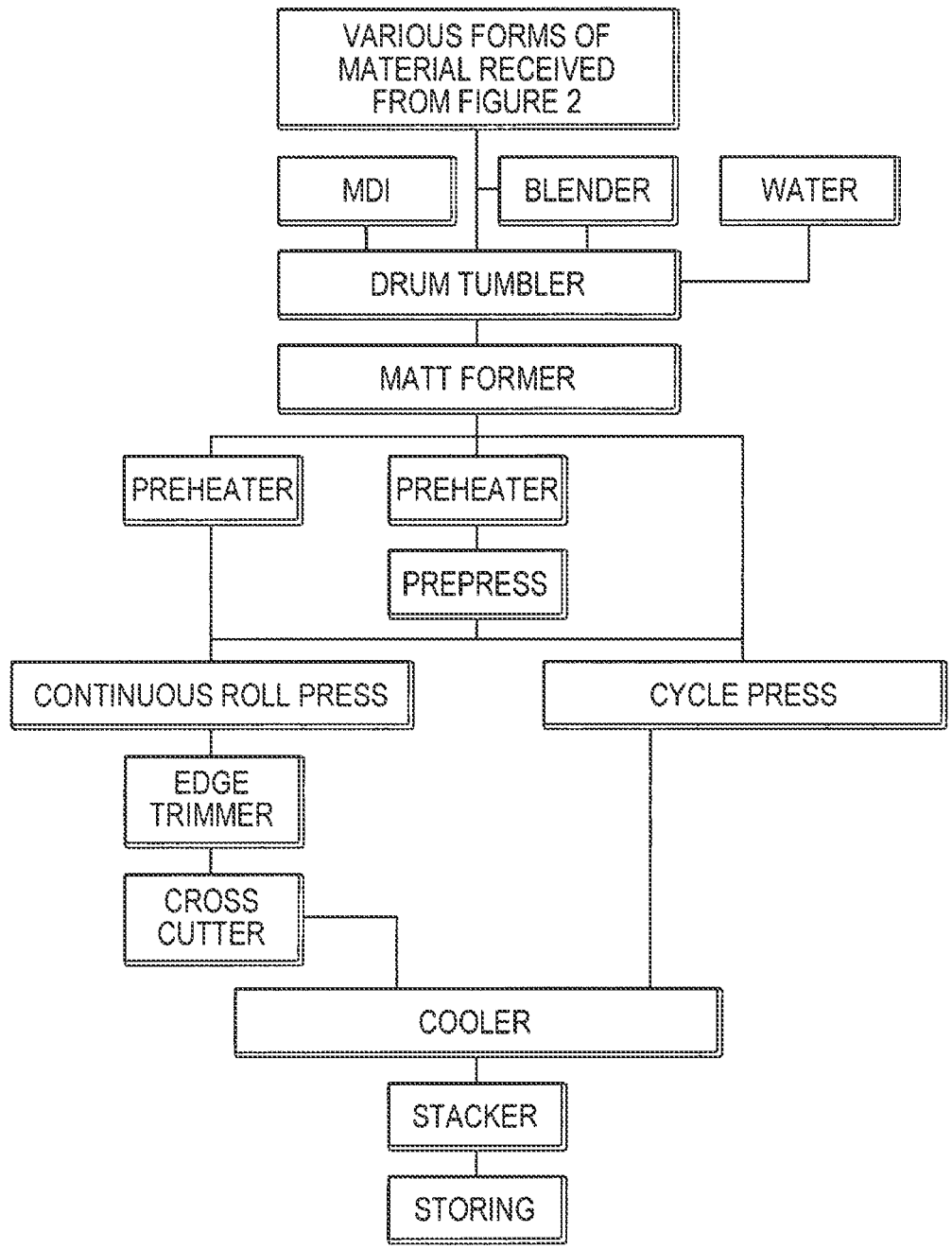
FIG. 3 depicts steps for coating the processed carpet waste material a bonding agent and subsequent forming process to produce the plastic composite product.

After the size reduction process(es), the carpet waste is ready to be formed into composite sheets, a process for which is depicted in FIG. 3. The carpet waste materials may be loaded into a large rotating drum or a drum with rotating mixing blades and/or a resination blow line. This equipment is used to coat the carpet waste with a binding agent. Other materials such as natural fiber fillers or inorganic fillers may be loaded with the carpet waste material. If the material is loaded into a drum, water and/or a binding agent (such as MDI) are sprayed out of the resination blow line to coat the materials, while the drum and/or blades spin to cause the material within to become evenly distributed. The addition of water may achieve a desired moisture content for the material and prepare the material for the binding agent. For the resination blow line method, the material is blown through a tube that has water and MDI introduced into it. The blowing action causes the air to become turbulent which allows the water and MDI to evenly coat the material. In one embodiment, the binding agent is applied in this manner to the granules or fibers at a concentration of about 1% to about 20% of the total weight of the granules plus any other additives. Concentrations between about 2% to about 10% and about 5% to about 6% are also contemplated. Generally, higher concentrations of resin produce composite sheets with higher moduli of elasticity and rupture. This coated carpet waste dries rapidly under ambient conditions, allowing the granules or fibers to continue to flow without adhering to one another. Accordingly, once coated and dried, the resin coated particles need not be used immediately, and may be stored and/or transported for later use.

The MDI-coated carpet waste and other additives (if applicable) are conveyed to a mat forming station that includes conveyors, metering scales, spreader heads and a control management system. The spreading equipment distributes the material onto a forming belt such that the spread material becomes a mat which has a generally uniform thickness, width and initial density. Board properties may be determined by the shape of the carpet waste composite particles/fibers and by their position in the formed mat. Additionally, the forming station can distribute more than one type of material for a multi-layered board. For example, the spreader head in the forming station could spread a mat of fibers on the forming belt, then a second spreader head could spread a mat of pellets on top of the fibers, then a third spread head could spread a top layer of fibers onto the pellets. Many different combinations of materials can be spread onto the forming belt to make various types of boards. The number of layers per board also can be varied. For example, a board could be manufactured to have an outer layer of carpet waste with a fiberglass core, or an outer layer comprising carpet waste pellets, and carpet waste fiber underlayers with a carpet waste pellet core.

After the mat is spread formed, the forming belt then transports the mat into a pre-heater, a pre-press, or directly to a press machine. The pre-heater and pre-press may be utilized to reduce total processing time of the composite sheet. Due to the thermal inertia and thickness of the material, heat from the press platens or rolls may take longer to penetrate the total thickness of the mat, thereby extending process time and costs. Preheating brings the temperature of the entire mat up to a higher starting temperature. The pre-press compresses the starting materials to a thickness that is more appropriate for introduction into the final presses and, additionally, the pre-heater and pre-press may be a single unit or separate units. In certain embodiments, the temperature of the mat can be elevated from about 65° F. to about 200° F. before entering the board forming process. This rapid heat transfer to the carpet waste may be accomplished by microwaves or by the injection of a steam/air mix (moist air) alternately from either surface into the mat. The steam condenses during this process, transferring the heat into the mat. The pre-heater may also pre-press or compress the material before it enters the board forming process. The heated mat is then transferred by an intermediate belt conveyor to the compression section of the infeed end of a continuous roll press or into a cycle press which is the beginning of the board-forming process.

In one embodiment, composite sheets are manufactured using a cycle press, which may have single or multi-daylight openings. Ranges of various process parameters for manufacturing various embodiments of PCs utilizing recycled carpet waste in a cycle press are presented in Table A-1, below. The composite material is transferred into the cycle press where it is subjected to temperature and pressure from a top and bottom platen that compresses the mat to a predetermined thickness or height. The elevated temperature and pressure activates the binding agent and, depending on the temperature, melts certain of the carpet components while leaving others unmelted, to produce in a finished board or sheet. During the cycle press process, steam may be injected into the mat to ensure thorough heating of the binding agent and bonding of the composite material. The cycle press may also use an active cooling cycle to reduce the temperature of the board before it exits the press. The platens may be engraved with a pattern to give the board outer surface a structured pattern.

TABLE A-1

Composite Sheet Processing Parameters (Cycle Press)

| | Range | |
|---|---|---|
| | High | Low |
| Total Time for heating material, during press-cycle [sec] | 360 | 60 |
| Temperature of Heating Plates [° F.] | 600 | 100 |
| Pressure of Heating Press [psi] | 6000 | 150 |
| Internal Temperature of Board [° F.] | 500 | 340 |
| Cure Time [sec] | 30 | 5 |
| Transition Time from Heating to Cooling Press [sec] | 600 | 0 |
| Total Time for cooling material, during press-cycle [sec] | 360 | 60 |
| Temperature of Cooling Plates [° F.] | 300 | 32 |
| Pressure of Cooling Press [psi] | 6000 | 150 |
| Internal Temperature of Board [° F.] | 300 | 70 |

Heat is generally delivered to the platens in the form of hot water, steam, electric coils, or circulating heated chemicals. In certain embodiments of the process, the platens may be heated from about 100° F. to about 600° F. Temperature ranges from about 200° F. to about 550° F., and about 340° F. to about 420° F. also may be desirable. Additionally, temperature ranges from about 420° F. to about 550° F. may be utilized. Final internal temperatures of the composite being compressed within the cycle press will be dependent at least in part on the temperature of the platens and compression time. If left in the cycle press for a sufficient period of time, the internal temperatures of the composite material will generally equal those of the platens, the ranges of which are given above. Final internal temperatures up to about 250° F., about 300° F., about 340° F., about 350° F., about 400° F., about 420° F., and about 480° F. have produced composite sheets displaying acceptable performance. Unlike known recycled carpet waste composite sheet material manufacturing processes, which heat the composite sheets to a temperature below the melting points of the carpet fibers and other carpet components, it has been discovered that heating the carpet waste to higher temperatures may be desirable. For example, temperatures of approximately 340° F. will melt polypropylene, a component in many modern carpet constructions, without melting any nylon fibers (that melt at about 420° F.). The melted polypropylene, combined with binding agent resins of the types disclosed herein, form a sheet material having very desirable properties. The unmelted nylon provides additional structural strength to the finished composite and may increase flexural strength, though completely melting the carpet fibers can also produce a PC displaying acceptable performance properties. Pressures applied by the platens in the heating press may range from about 150 psi to about 6000 psi or greater, to obtain a the desired thickness and density.

The cycle press may include channels within the platens that thereafter circulate water or chemical coolant(s) to reduce the temperature of the board. The water or coolants may be chilled and volumetric flow rates controlled to reduce the total cooling time for the board to achieve acceptable manufacturing cycle time. This cooling step may take place in the heating press or the board may be transferred from the heating press to a cooling press. If the board is transferred from the heating press to the cooling press, the transfer time should be minimized to avoid warping of the PC. It has been determined that transfer time of less than about 600 seconds are acceptable. The cooling platens may have a temperature range of about 300° F. to about 32° F. Cooling temperature ranges from about 390° F. to about 65° F. may also be desirable. Ranges from about 250° F. to about 180° F. may also be utilized. If left in the cycle press for a sufficient period of time, the internal temperatures of the composite material will generally equal those of the platens, the ranges of which are given above. Final internal temperature of as high as 300° F., however, may be desirable to minimize warping of the composite sheet. Additionally, final internal temperatures of about 100° F., about 80° F., and about 70° F. have produced composite sheets displaying acceptable performance. The board is rapidly cooled under pressure to maintain its flatness. Due to its high polymer content, the board will usually warp if allowed to cool unrestrained using ambient air. Pressures applied by the platens in the heating press may range from about 150 psi to about 6000 psi or greater.

Table B presents the ranges of various components that may be utilized in composite formulations to produce acceptable PCs. Specifically, materials utilized may include colorants, wood filler, fire retardants, fiberglass, mold inhibitors, binders, and recycled carpet waste. The recycled carpet waste can be about 20% to about 98% of the total formula weight and still retain acceptable physical properties in the composite sheet. Certain embodiments may include carpet wastes in the amount of about 90% to about 98% total weight. Still other embodiments may include carpet wastes in the amount of about 94% to about 95% total weight. It has been found that composites that utilize approximately 95% carpet waste and about 5% binding agent produce a composite that exhibits satisfactory performance while being economically advantageous, due to the low cost associated with using recycled carpet waste versus virgin materials. In other embodiments, a 9:1 ratio of carpet waste to MDI, up to a 49:1 ratio of carpet waste to MDI may be utilized. Table B also presents percentages of additives, such as wood filler, color, fire retardant, fiberglass, and mold inhibitor that may be added to the binder/carpet waste mixture. The percentages of these additives may be up to those identified in Table B, relative to the carpet waste/MDI content. Additionally, there is no discernible difference in the performance of the composite when using recycled carpet waste obtained from post-industrial carpet waste or post-consumer carpet waste, as compared with using virgin materials.

TABLE B

Formulation Ranges for Composite Sheets

| Material | Range Low % | Range High % |
|---|---|---|
| Carpet Waste | 80 | 98 |
| Moisture Content | 0 | 10 |

TABLE B-continued

Formulation Ranges for Composite Sheets

| Material | Range Low % | Range High % |
|---|---|---|
| Additives: | | |
| Binders: MDI | 2 | 20 |
| UF | 2 | 20 |
| MF | 2 | 20 |
| PF | 2 | 20 |
| Wood filler | 0 | 65 |
| Color | 0 | 25 |
| Fire Retardant | 0 | 25 |
| Fiberglass | 0 | 50 |
| Mold Inhibitor | 0 | 25 |

Tables C-1 to C-4 present formulations and performance parameters for PCs made in accordance with the cycle press process described above. Tables C-1, C-2, and C-3 present this information for PCs made with different types of binding agents, but having the same total percentage of binding agents. The water absorption, thickness swell and moisture content testing was performed in accordance with the ASTM D1037-96A testing standard. The PC described in Table C-1 is made with MDI and has higher modulus of rupture (MOR) and modulus of elasticity (MOE) values, with lower moisture absorption properties.

TABLE C-1

Example 1 Formulations and Performance Properties

| Material | % |
|---|---|
| Carpet Waste | 90.2% |
| Moisture Content | 4.8% |
| Additives: | |
| Binders: MDI | 5.0% |
| UF | 0.0% |
| MF | 0.0% |
| PF | 0.0% |
| Wood filler | 0.0% |
| Color | 0.0% |
| Fire Retardant | 0.0% |
| Fiberglass | 0.0% |
| Mold Inhibitor | 0.0% |
| total | 100% |
| Thickness (inch) | 0.250 |
| Density (pcf) | 53.3 |
| MOR (psi) | 1,866 |
| MOE (psi) | 80,331 |
| Tensile - Perpendicular [IB] (psi) | 728 |
| Tensile - Parallel (psi) | 14 |
| Linear Expansion | 0.10% |
| Thickness Swell (inch) | 0.002 |
| Thickness Swell (%) | 0.00% |
| Moisture Content (%) | 0.27% |

Table C-2 presents information for a PC utilizing PF as the binding agent, that results in significantly lower, though still acceptable, MOR and MOE values.

TABLE C-2

Example 2 Formulations and Performance Properties

| Material | % |
|---|---|
| Carpet Waste | 90.2% |
| Moisture Content | 4.8% |

TABLE C-2-continued

Example 2 Formulations and Performance Properties

| Material | % |
|---|---|
| Additives: | |
| Binders: MDI | 0.0% |
| UF | 0.0% |
| MF | 0.0% |
| PF | 5.0% |
| Wood filler | 0.0% |
| Color | 0.0% |
| Fire Retardant | 0.0% |
| Fiberglass | 0.0% |
| Mold Inhibitor | 0.0% |
| total | 100% |
| Thickness (inch) | 0.250 |
| Density (pcf) | 48.0 |
| MOR (psi) | 971 |
| MOE (psi) | 49,600 |
| Tensile - Perpendicular [IB] (psi) | 716 |
| Tensile - Parallel (psi) | 58 |
| Linear Expansion | 0.54% |
| Thickness Swell (inch) | 0.007 |
| Thickness Swell (%) | 2.97% |
| Moisture Content (%) | 4.12% |

Table C-3 presents information for a PC manufactured with a mixture of MDI and UF as binding agents. While this formulation displays performance characteristics higher than those listed for the Table C-2 sample, the performance values are not as high as the sample using MDI as the binding agent, presented in Table C-1.

TABLE C-3

Example 3 Formulations and Performance Properties

| Material | % |
|---|---|
| Carpet Waste | 90.2% |
| Moisture Content | 4.8% |
| Additives: | |
| Binders: MDI | 1.25% |
| UF | 3.75% |
| MF | 0.0% |
| PF | 0.0% |
| Wood filler | 0.0% |
| Color | 0.0% |
| Fire Retardant | 0.0% |
| Fiberglass | 0.0% |
| Mold Inhibitor | 0.0% |
| total | 100% |
| Thickness (inch) | 0.250 |
| Density (pcf) | 45.4 |
| MOR (psi) | 1,359 |
| MOE (psi) | 66,716 |
| Tensile - Perpendicular [IB] (psi) | 1002 |
| Tensile - Parallel (psi) | 44 |
| Linear Expansion | 0.31% |
| Thickness Swell (inch) | 0.007 |
| Thickness Swell (%) | 2.78% |
| Moisture Content (%) | 3.02% |

Table C-4 presents a composite sheet utilizing 25% wood filler, with double the amount of binding agent utilized in the Table C-1 through Table C-3 samples. Estimates of the performance properties of this sample utilizing wood filler are identified with an asterisk.

TABLE C-4

Example 4 Formulations and Performance Properties

| Material | % |
|---|---|
| Carpet Waste | 60.0% |
| Moisture Content | 5.0% |
| Additives: | |
| Binders: MDI | 10.00% |
| UF | 0.00% |
| MF | 0.0% |
| PF | 0.0% |
| Wood filler | 25.0% |
| Color | 0.0% |
| Fire Retardant | 0.0% |
| Fiberglass | 0.0% |
| Mold Inhibitor | 0.0% |
| total | 100% |
| Thickness (inch) | 1.000 |
| Density (pcf) | 66.7 |
| MOR (psi) | 2,815 |
| MOE (psi) | 236,000 |
| *Tensile - Perpendicular [IB] (psi) | 1500 |
| *Tensile - Parallel (psi) | 100 |
| *Linear Expansion | 0.40% |
| *Thickness Swell (inch) | 0.010 |
| *Thickness Swell (%) | 3.00% |
| *Moisture Content (%) | 3.00% |

The differences in the performance properties of the above-identified examples indicate that the types and amounts of binders may be varied as desired to achieve acceptable results. Binder type and amount may be varied to effect cost or other properties. Although particular embodiments have not yet been tested, additives such as fire retardants may be added to produce a composite sheet having a Class A fire rating.

According to an alternative embodiment, the PC may be manufactured using a continuous roll process. The continuous roll press is a double belted press capable of maintaining a range of temperatures and pressures on the mat to allow the binding agent reaction and melting of select components to take place. The continuous roll press belts may be steel or other material. Process parameters for a continuous roll press are depicted in Table A-2. Temperatures utilized are generally similar to those utilized in the cycle press process.

TABLE A-2

Composite Sheet Processing Parameters (Continuous Roll Press)

| | Range | |
|---|---|---|
| | High | Low |
| Temperature of Heating Rolls [° F.] | 600 | 100 |
| Pressure of Heating Rolls [psi] | 6000 | 150 |
| Internal Temperature of Board [° F.] | 500 | 340 |
| Temperature of Cooling Plates [° F.] | 300 | 32 |
| Pressure of Cooling Rolls [psi] | 6000 | 150 |
| Internal Temperature of Board [° F.] | 300 | 70 |

For example, pressures from about 150 psi to about 6000 psi are used to squeeze the fiber mat to the desired thickness and density of the final product. The continuous roll press consists of a press structure that tensions the belts. In general, the press includes a number of frame units, depending on the length of the press and pressure that is required for a particular application. Cylinders arranged at the frame units in various combinations exert the desired pressure. The press includes top and bottom heated platens which roller rods and the belts travel over. The press has an infeed head to guide the roller rods, belts and mat to be pressed. The roller rods are located between the heated platens and the belts and support the mat as it is moved from one cylinder to the next. The belts are driven by two or more drums at generally opposite ends of the roll press. Drum scrapers may be used to keep the board from sticking to the belts. A release agent also may be sprayed onto the belts to keep the mat from sticking to the belts, allowing the composite to exit easily the press at the completion of forming. A control system regulates the operation of the press, such as the speed of the belts, temperature, pressure, thickness of the mat, etc.

The continuous roll press transfers heat to the binding agent-coated composite material. As the heat activates the coating, the cylinders press the mat together to achieve the desired thickness. Thus, while the mat material moves from the infeed section of the press, the mat's thickness is reduced while being heated to a temperature that ensures activation of the binding agent and melting of certain fibers. As the mat moves through the continuous roll press, the platens gradually reduce the thickness of the mat to a predetermined thickness. Depending on the amount of material introduced to the infeed section of the press, the density of the finished board is directly related to its final thickness.

After the binding of the material and desired height dimension of the mat has been reached in a continuous roll press, a board is formed which is in the shape of a continuous ribbon. When the ribbon exits the press, it undergoes a continuous edge trimming operation to reach the desired width and then it is cross-cut to a pre-selected length. The ribbon is transported through the trimming and cross-cutting operations by a roller conveyor and pinch rollers. The cut boards are then transported to a cooling station. The cooling station can employ a variety of different machines such as a star cooler, with subsequent stacking, or a stacking roller conveyor. The star cooler is a large diameter wheel with multiple rows of spoked arms extending from the wheel. The arms lift each board from the conveyor and allow the boards to rotate with the wheel and be air cooled. If needed, the continuous roll press can have a cooling section with chilled rollers near the press outlet. This will cool the board (as described above) eliminating the need for further cooling. The board is then conveyed to a stacking operation and stored for future use. Alternatively the boards may be conveyed to a separate cooling press as described above. The boards are now ready to be shipped or they can go through a variety of decorating alternatives.

Figure 4:
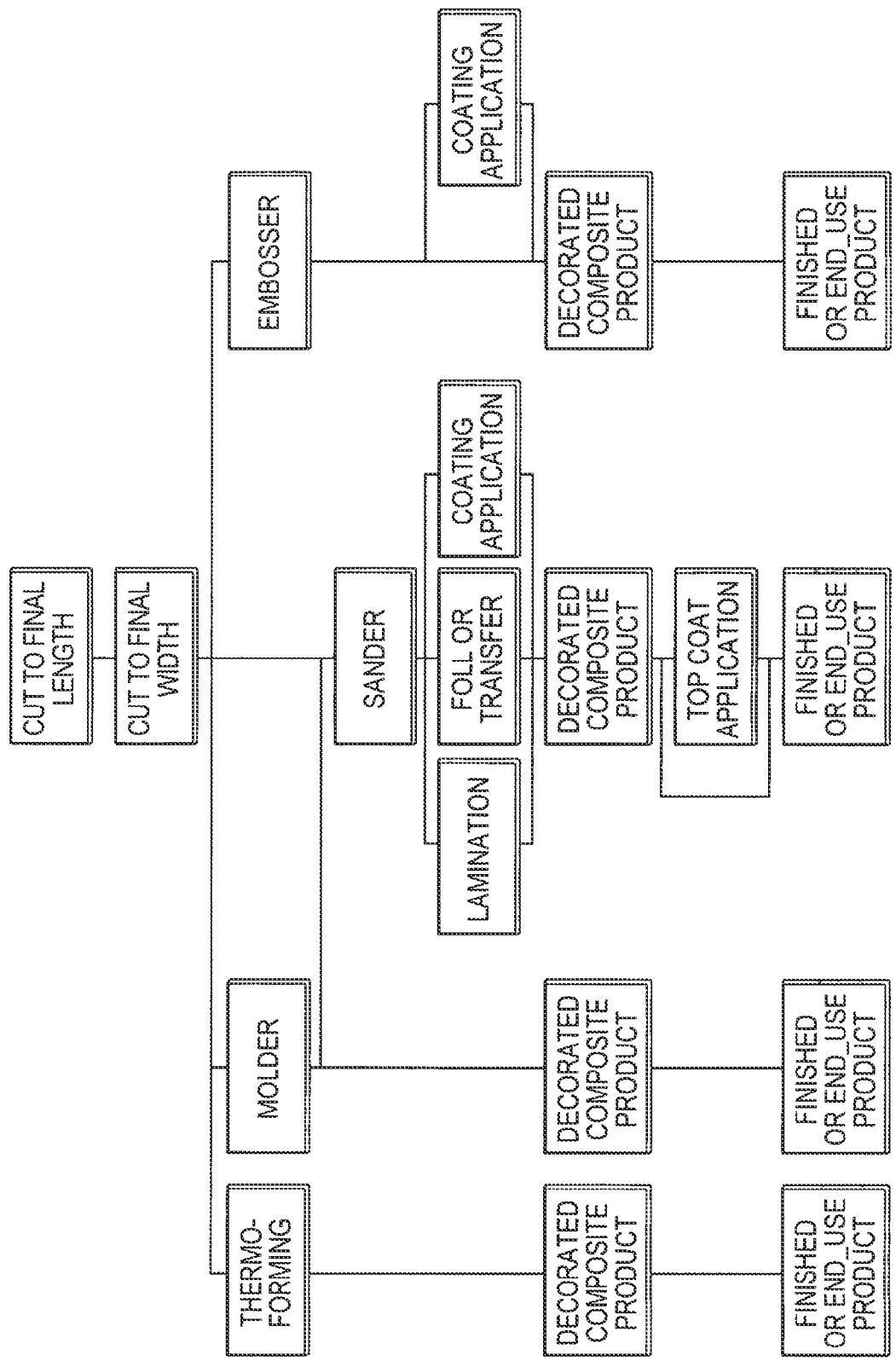
FIG. 4 depicts steps for finishing the plastic composite product.

FIG. 4 shows the finishing and decorating steps that may be employed following cutting to final width. The composite product can now be processed further to change the cross-sectional profile to take on the shape required in the finished product. The processing can be done on a variety of cutting machines of different designs, the most common of which is a molder using rotating knives. This machine allows for the setting of the knife blades to adjust the cut to the desired profile. Another common device is the router which cuts a specific groove or grooves (routs) into the surface of the composite product. The router has the same effect as the molder in that it changes the initial profile out of the process into the desired profile required for the final product.

The profile may also be changed using thermoforming methods. In this case, the composite product is placed in a mold of the desired profile and with heat and pressure the product takes on the shape of the mold. This profile change offers an additional decorating capability in that the desired color and/or pattern may be on a transfer foil placed in the mold. With the application of the heat and pressure during the process, the color and/or pattern are transferred from the carrier foil to the composite product. Thus, at the end of the thermoforming process, the composite product has the desired profile and also the desired decoration.

The composite product may be embossed after manufacturing. The embossing is accomplished with an embossing plate or roll. The plate or roll has the pattern to be transferred to the product on the surface of the plate or roll. This surface is heated to a temperature that will soften the surface of the composite product. Then the plate or roll is pressed onto the surface of the product to give the desired pattern transfer. As the surface of the composite product cools, the embossed pattern becomes fixed on the surface of the composite product. The embossed composite product is now ready to be coated, or if no coating is required for the end-use product, it is ready for packaging.

Composite products that will be decorated first pass through a sander. This smoothing of the surface prepares the product for coating, transfers, and laminating. The sanded or embossed composite product may be coated with primers, finish paints, or stains. The coating application employs various conventional spray techniques using exhaust systems to remove the excess spray and solvents. Either penetrating or film-forming coatings may also be applied, and the choice is dependent on the desired finished product appearance and application. The sanded composite product can also act as a core to which decorative and protective layer(s) may be hot stamped from a foil or film or laminated to achieve improved physical and visual enhancement. In this regard, U.S. patent application Ser. No. 11/054,258, filed Feb. 9, 2005, and published as U.S. Patent Application Publication No. 2006/0147693, and U.S. Provisional Patent Application Ser. No. 60/641,308, filed Jan. 4, 2005, describe exemplary processes and are incorporated by reference herein in their entireties.

The composite product also may be decorated using transfer foils. Once again the product is first sanded to smooth the surface, then an adhesive layer is applied to the profile using a conventional application technique. The transfer foil has the desired color and/or pattern on a polymeric substrate, and is brought into contact with the surface of the product using stamping equipment designed for the specific application. Using heat and pressure, the color and/or pattern is transferred from the foil to the product. The heat required for the transfer activates an adhesive layer on the surface of the profile ensuring bonding of the decoration to the profile. With the color and/or pattern now on the composite product, the spent foil is then collected for disposal, and the finished product has the desired decorated effect.

Another decorating method that may be employed is lamination. Several materials may be used as the laminate surface, such as wood veneers, synthetic veneers, foils, films, and polymeric sheets. The application of rigid laminates like wood veneers is done using conventional laminating equipment. Generally, an adhesive system (either a wet adhesive system or a hot-melt adhesive system) employing a primer and an adhesive is applied to the PC substrate. The rigid surface laminate is then applied to the substrate and temperature and pressure are applied. After the temperature-pressure step, the laminated product is then set for a fixed period of time to allow the adhesive system to cure. In the case of the composite product, the composite product is the substrate. The adhesive system, usually a hot-melt adhesive, is applied to the composite product. The rigid veneer is then placed on the adhesive layer forming a sandwich of composite product, adhesive, and rigid laminate. The sandwich is then pressed to secure the bond of the laminate to the composite product. After curing the laminated product with the desired decorative appearance is ready for packaging.

Another laminating technique used with the composite product is foil laminating. This technique can be referred to as wrapping; wherein, the composite product profile is wrapped in the decorative foil. After the composite product profile has been sanded, the profile passes through a wrapping device that takes the foil wrap from a coil then applies the adhesive (and primer, if required) to the foil. In a continuous process, the foil wrap is then passed over the composite product profile. Using a series of rollers, the foil wrap is shaped to the composite product profile. The foil wrap may incorporate an integral topcoat material, such as polyurethane, acrylic, or other protective materials, for physical property enhancement. If, however, the foil wrap integrates only the decorative elements, then the wrapped composite product will require a separate topcoat for certain applications.

If the end-use product application requires significant surface property enhancements, such as abrasion resistance, a topcoat may be added to the decorating process. The topcoat can be polyurethane, acrylic, or other protective material that will impart better physical properties to the surface of the wrapped finished product. The topcoat may be spray applied or hot melt applied. If spray applied, the wrapped composite product will pass through a spray applicator and then may or may not pass through a curing device, such as an ultra-violet radiation station. If the topcoat is hot melt applied, then a layer of polyurethane is applied to flat surfaces of the decorated composite product. The cure process for this type of material is time dependent and could take several days depending on the hot melt topcoat chosen for a specific end-use application for the completed finished product.

A number of embodiments of the invention have been described. Nevertheless, it will be understood that various modifications may be made without departing from the spirit and scope of the invention. Accordingly, other embodiments are within the scope of the following claims.

What is claimed is:

1. A composite building material comprising:
   a first layer comprising a first carpet waste, a first binding agent, and an inorganic filler in addition to any filler present in the first carpet waste; and
   a second layer disposed on the first layer, the second layer comprising a second carpet waste, a second binding agent, and a colorant.

2. The composite building material of claim 1, wherein at least one of the first carpet waste and the second carpet waste comprises a processed carpet waste comprising a reduced amount of inorganic filler relative to an amount present within an unprocessed carpet waste.

3. The composite building material of claim 1, wherein the first binding agent and the second binding agent are each selected from the group consisting of methylenediphenyldiisocyanate (MDI), urea formaldehyde (UF), melamine urea formaldehyde (MUF), and phenol formaldehyde (PF).

4. The composite building material of claim 1, wherein at least one of the first binding agent and the second binding agent comprises methylenediphenyldiisocyanate (MDI) and water.

5. The composite building material of claim 1, wherein the first layer further comprises natural fibers.

6. The composite building material of claim 1, further comprising at least one of a patterned surface, a cover layer, and a sanded surface.

7. The composite building material of claim 6, wherein the patterned surface comprises at least one of a molded surface, an embossed surface, a colored surface, and a wood grain pattern.

8. The composite building material of claim 6, wherein the cover layer comprises a coating selected from the group consisting of primers, paints, stains, polyurethane, and acrylic.

9. The composite building material of claim 1, further comprising fiberglass.

10. The composite building material of claim 9, wherein the fiberglass defines a third layer of the composite building material.

11. The composite building material of claim 1, wherein the first carpet waste and the second carpet waste are in a form selected from the group consisting of particles, fibers, pellets, and combinations thereof.

12. A method of manufacturing a composite building material, the method comprising the steps of:
    forming a first mat comprising a first carpet waste, a first binding agent, and an inorganic filler in addition to any filler present in the first carpet waste;
    forming a second mat on the first mat, the second mat comprising a second carpet waste, a second binding agent, and a colorant; and
    heating and pressing the first mat and the second mat together to form the composite building material.

13. The method of claim 12, wherein at least one of the first carpet waste and the second carpet waste comprises a processed carpet waste comprising a reduced amount of inorganic filler relative to an amount present within an unprocessed carpet waste.

14. The method of claim 12, wherein the first binding agent and the second binding agent are each selected from the group consisting of methylenediphenyldiisocyanate (MDI), urea formaldehyde (UF), melamine urea formaldehyde (MUF), and phenol formaldehyde (PF).

15. The method of claim 12, wherein at least one of the first binding agent and the second binding agent comprises methylenediphenyldiisocyanate (MDI) and water.

16. The method of claim 12, further comprising adding natural fibers to the first mat.

17. The method of claim 12, further comprising adding at least one of a patterned surface, a cover layer, and a sanded surface to the composite building material.

18. The method of claim 17, wherein the patterned surface comprises at least one of a molded surface, an embossed surface, a colored surface, and a wood grain pattern.

19. The method of claim 17, wherein the cover layer comprises a coating selected from the group consisting of primers, paints, stains, polyurethane, and acrylic.

20. The method of claim 12, further comprising adding fiberglass to at least one of the first mat and the second mat.

21. The method of claim 12, further comprising disposing a layer of fiberglass on at least one of the first mat and the second mat.

22. The method of claim 12, wherein the first carpet waste and the second carpet waste are in a form selected from the group consisting of particles, fibers, pellets, and combinations thereof.

23. A composite building material comprising:
    a processed carpet waste comprising at least one of polyester and sisal; and a binding agent in intimate association with the processed carpet waste, wherein at least one of (i) the processed carpet waste comprises a reduced amount of inorganic filler relative to an amount present within an unprocessed carpet waste, and (ii) the composite building material comprises an inorganic filler in addition to any filler present within the carpet waste and any synthetic fiber filler.

24. The composite building material of claim 23, further comprising sisal.

25. The composite building material of claim 23, further comprising a sheet having a first exterior surface and a second exterior surface defining a thickness, the sheet comprising a substantially homogeneous mixture from the first surface across the thickness to the second surface.

26. The composite building material of claim 23, further comprising an external surface comprising at least one surface feature selected from the group consisting of a molded patterned surface, an embossed patterned surface, and a hot-stamped layer.

27. A method of producing a composite building material, the method comprising the steps of:
providing a processed carpet waste comprising at least one of polyester and sisal;
mixing the processed carpet waste with a binding agent to produce a carpet waste mixture; and
heating and pressing the carpet waste mixture to form the composite building material,
wherein at least one of (i) the processed carpet waste comprises a reduced amount of inorganic filler relative to an amount present within an unprocessed carpet waste, and (ii) mixing the processed carpet waste comprises adding an inorganic filler to the carpet waste mixture, the added inorganic filler being present in the carpet waste mixture in addition to any filler present within the carpet waste and any synthetic fiber filler.

28. The method of claim 27, further comprising adding sisal to the carpet waste mixture.

29. The method of claim 27, wherein heating and pressing the carpet waste mixture comprises forming a sheet having a first exterior surface and a second exterior surface defining a thickness, the sheet comprising a substantially homogeneous mixture from the first surface across the thickness to the second surface.

30. The method of claim 27, further comprising adding at least one surface feature to an external surface of the composite building material, the at least one surface feature selected from the group consisting of a molded patterned surface, an embossed patterned surface, and a hot-stamped layer.

* * * * *